United States Patent
Triscori et al.

(10) Patent No.: US 7,632,341 B2
(45) Date of Patent: Dec. 15, 2009

(54) HYBRID WET ELECTROSTATIC PRECIPITATOR

(75) Inventors: Ronald J. Triscori, Kent, OH (US); Albert L. Moretti, Stow, OH (US); Robert E. Snyder, Uniontown, OH (US); Donald P. Tonn, Copley, OH (US)

(73) Assignee: Babcock & Wilcox Power Generation Group, Inc., Baberton, OH (US)

( * ) Notice: Subject to any disclaimer, the term of this patent is extended or adjusted under 35 U.S.C. 154(b) by 0 days.

(21) Appl. No.: 12/056,417

(22) Filed: Mar. 27, 2008

(65) Prior Publication Data
US 2009/0241781 A1 Oct. 1, 2009

(51) Int. Cl.
*B03C 3/014* (2006.01)

(52) U.S. Cl. .................. 96/44; 95/71; 95/75; 96/50; 96/53

(58) Field of Classification Search .......... 96/44, 96/45, 50, 52, 53; 95/59, 64, 65, 71, 75
See application file for complete search history.

(56) References Cited

U.S. PATENT DOCUMENTS

| | | | | |
|---|---|---|---|---|
| 4,035,886 A | * | 7/1977 | Gluck | 445/67 |
| 4,058,377 A | * | 11/1977 | Schminke et al. | 96/93 |
| 4,239,514 A | * | 12/1980 | Junkers | 96/87 |
| 4,276,056 A | * | 6/1981 | Pasic et al. | 95/76 |
| 4,321,067 A | * | 3/1982 | Gupner et al. | 96/74 |
| 4,885,139 A | * | 12/1989 | Sparks et al. | 422/169 |
| 5,137,546 A | * | 8/1992 | Steinbacher et al. | 95/71 |
| 5,601,791 A | * | 2/1997 | Plaks et al. | 422/169 |
| 5,624,476 A | * | 4/1997 | Eyraud | 95/65 |
| 6,231,643 B1 | * | 5/2001 | Pasic et al. | 95/75 |
| 6,302,945 B1 | * | 10/2001 | Altman et al. | 96/44 |
| 6,488,740 B1 | * | 12/2002 | Patel et al. | 95/71 |
| 2003/0000388 A1 | * | 1/2003 | Tomimatsu et al. | 96/44 |
| 2003/0217642 A1 | * | 11/2003 | Pasic et al. | 96/44 |

* cited by examiner

*Primary Examiner*—Richard L Chiesa
(74) *Attorney, Agent, or Firm*—Michael J. Seymour; Eric Marich

(57) ABSTRACT

A hybrid, wet electrostatic precipitator has multiple precipitation zones for removing particulate and contaminants from a flue gas stream. A first precipitation zone has at least one discharge electrode and at least one collection plate made of a metal or a fiber glass reinforced plastic. A second precipitation zone has at least one discharge electrode and at least one collecting electrode which is a porous membrane sheet. The precipitation zones are in series with one another.

16 Claims, 1 Drawing Sheet

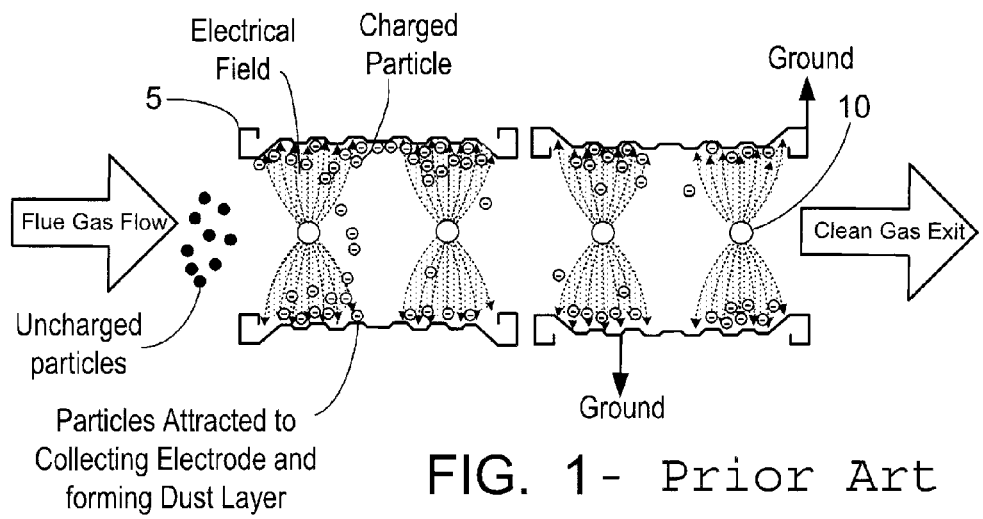
FIG. 1 - Prior Art
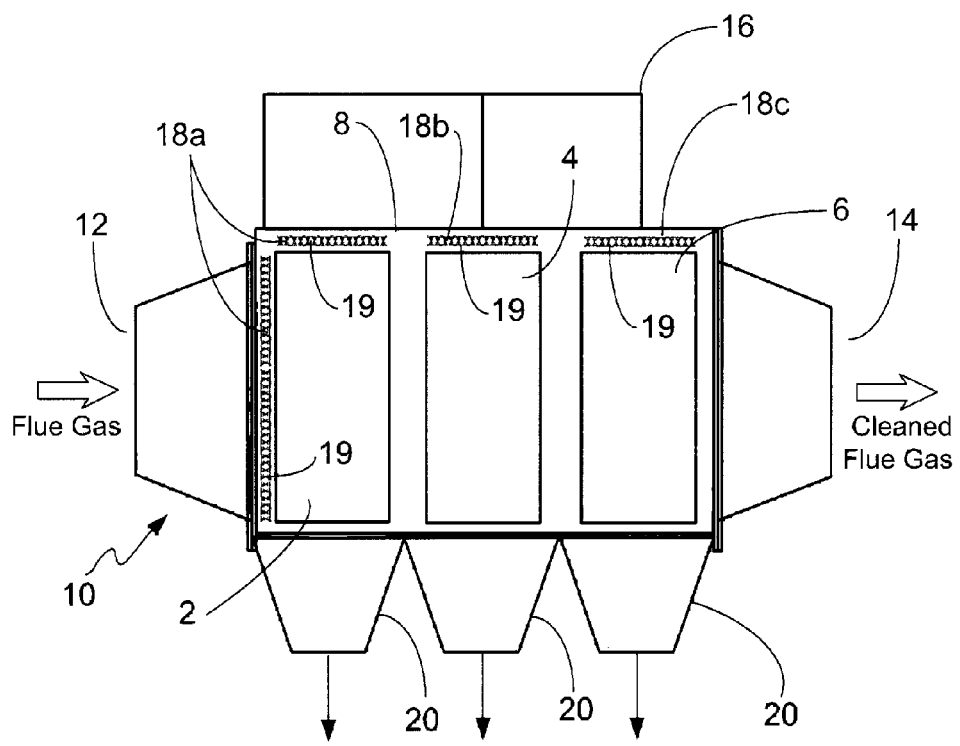
FIG. 2

HYBRID WET ELECTROSTATIC PRECIPITATOR

FIELD AND BACKGROUND OF INVENTION

The present invention relates generally to the field of flue gas cleanup apparatuses and, in particular, to a new and useful hybrid, wet electrostatic precipitator (HWESP) used to remove particulate and contaminants from exhaust gases.

Electrostatic precipitators (ESPs) are used in coal-fired power plants, the cement industry, mineral ore processing and many other industries to remove particulate from an exhaust gas stream. ESPs are particularly well suited for high efficiency removal of fine particles from a gas stream. Specially designed dry ESPs have attained particle collection efficiencies as high as 99.9%. However, conventional ESP collection efficiencies are at their lowest values for fine particle sizes between 0.1-1.0 microns. Additionally, conventional ESPs cannot address the problem of gaseous emissions or gas-to-particle conversion. The release of substances such as acid gases and mercury from the flue gas generated by the combustion of fossil fuel poses a major health concern and is regulated by law.

An ESP electrically charges the ash particles in the flue gas to collect and remove them. As shown in FIG. 1, the unit is comprised of a series of parallel vertical collection plates 5 through which the flue gas passes. Centered between the plates are charging electrodes 10 which provide the electric field. The collection plates 5 are typically electrically grounded and are the positive electrode components. The discharge electrodes 10 in the flue gas stream are connected to a high voltage power source, typically 55 to 75 k V DC average, with a negative polarity. An electric field is established between the discharge electrodes and the collecting surface. As the flue gas passes through the electric field, the particulate takes on a negative charge which, depending on particle size, is accomplished by field charging or diffusion. The negatively charged particles are attracted toward the grounded collection plates 5 and migrate across the gas flow. Some particles are difficult to charge, requiring a strong electric field. Other particles are charged easily and are driven toward the collection plates 5 but also may lose the charge easily requiring recharging and recollection. Gas velocity between the collection plates 5 is also an important factor in the collection process since lower velocities permit more time for the charged particles to move to the collection plates 5 and reduce the likelihood of re-entrainment. In addition, a series zones of collection plates 5 and discharge electrodes 10 are necessary to maximize overall particulate collection by increasing the opportunities of the individual ash particles to be charged and collected. The ash particles form an ash layer as they accumulate on the collection plates 5. The particles remain on the collection plate surface due to the forces from the electric field as well as the molecular, mechanical, cohesive, and adhesive forces between particles. These forces also tend to make the particles agglomerate or cling together. Examples of a typical ESP structure is shown and described in U.S. Pat. Nos. 4,276,056, 4,321,067, 4,239,514, 4,058,377, and 4,035,886, which are incorporated herein by reference.

The collection of acid mists, consisting of fine particulate, has been accomplished with wet ESPs in many industrial processes. These units differ from the dry, or conventional, ESPs in materials of construction and cleaning methods; however, the collection mechanism is basically the same. In wet ESPs, cleaning of the collecting plates is performed by washing the collection surface with liquid, rather than mechanically rapping the collection plates or utilizing sonic horns, as with dry ESPs. Reintrainment from the cleaning of the collection plate surface is generally not an issue in wet ESP. Wet ESPs use the wetting of the collection surface area to remove particulate from the collection plate, which drains into a hopper, trough, or pan. Because wet ESPs operate in a wet environment in order to wash the collection surface, they can handle a wider variety of pollutants and gas conditions than dry ESPs.

In most wet ESPs, both tubular and flat-plate, the collection surface normally is a plain, solid, continuous sheet of metal or plastic. Therefore, the flushing liquid passing over the surface tends to "bead" due to both surface tension effects, as well, as the geometric imperfections of the surface. Because the flushing liquid cannot be uniformly distributed over the surface, this beading can lead to channeling and formation of "dry spots" of collected particles. The resulting build-up of collected material can cause the ESP electrical performance to degrade because the accumulated material is not as good a conductor as the underlying substrate or the water. As a result, current flow is inhibited, which results in increased emissions.

A wet ESP's collection section can be made out of any conductive material. Wet ESP components have been made out of conductive fiberglass, carbon steel, various stainless steels and various high-end alloys. Non-conductive materials can also be used if the material is wetted to provide a means of surface conductivity. Wet ESPs fabricated with metal collecting plates may require expensive high alloy stainless steels to withstand corrosion from the various wet environments.

Pasic et al., in U.S. Pat. No. 6,231,643, which is incorporated herein by reference, first disclosed the principle of using a membrane as a collecting electrode in a dry or a wet ESP. However, the turbulent flow of gases around the membrane electrodes of Pasic et al. prevents substantial collection of acid aerosols and fine particulate.

The structure forming the sides and roof of an ESP is typically a gas-tight metal encased enclosure. The structure rests on a lower grid, which serves as a base and is free to move as needed to accommodate thermal expansion. All of the collecting plates and the discharge electrode system are top supported from the upper girder assemblies. Access doors in the casing and adequately sized walkways between the fields assist in maintenance access for the internals. Metal pyramid or trough shaped hoppers or pans are supported from the lower grid and are made of externally stiffened casing. Hoppers are generally designed as particulate and liquid collection devices.

SUMMARY OF INVENTION

It is an objective of the present invention to provide an improved apparatus for removing acid gases ($H_2SO_4$ HF, HCl, $H_2S$, HBr, etc.), particulate, heavy metals and condensables, including organic hydrocarbons, contained in flue gas formed during the combustion of fossil fuels and/or waste materials which are burned by electric power generating plants, waste to energy plants and other industrial processes.

The invention is a hybrid wet electrostatic precipitator comprising more than one collection zone. The first collection zone has at least one, and preferably a plurality of discharge electrodes disposed in the gas stream. At least one, and preferably a plurality of, collecting electrodes is disposed in the gas stream substantially parallel to the discharge electrodes in the direction of gas flow. The collecting electrodes of the first collection zone are made of a non porous material, preferably metal, however other non porous material such as fiberglass may also be utilized.

A second electric precipitation zone is located downstream of the first zone and in series therewith. The collecting electrodes of the second zone are made of a substantially water-saturated porous membrane. Subsequent collection zones beyond the second zone, if necessary, are also preferably made of a substantially water-saturated porous membrane. In one embodiment of the present invention four collection zones utilizing a membrane follow downstream of a first collection zone comprised of metal.

The collecting electrodes have an electrical charge that is opposite in polarity to the electrical charge of the discharge electrodes. This thereby forms an electric field between the electrodes to cause particulate matter from the gas stream to be charged and precipitated onto the collecting electrode during operation. The water serves as a conductor, a trap for the matter that is collected, and a means to clean the particulate matter from the membrane.

The membrane can be made of numerous materials including but not limited to fabric-type woven fibers. The fibers can be made from various materials, including carbon, polymers, silica and ceramics. One such preferable polymer is polypropylene. Other examples could be ultra light composite sheets and wire-based dense screens made from very thin corrosion resistant metal alloys.

While metal plates would be subject to increased corrosion and may not be able to maintain a continuously wetted surface, a membrane made of a corrosion resistant weave from thin fibers, with good wetting properties, facilitates a continuously wetted surface by means such as osmosis. Drastically decreased mass of membranes reduces the effort and costs required for installation, transportation, maintenance, and service, while also reducing overall costs in both retrofit and in new construction applications. Re-entrainment of particles may be minimized via water spraying of corrosion-resistant membranes that facilitate wetting in wet and hybrid electrostatic precipitators. The combination of improvements facilitated by the use of membrane could result in smaller precipitators as fewer fields may be required, lower costs, and improved ease and efficiency of existing precipitators through low cost retrofitting. Membranes allow novel cleaning techniques to be used to remove dust layers, while at the same time increasing collection efficiency and decreasing re-entrainment. This leads to smaller ESPs or more efficient retrofits for existing units. Also, unlike plates, membranes can be subjected to a relatively small force during cleaning, and therefore need no stiffeners. The gas flow is uniform and the particle-collection efficiency should be increased. Increasing uniformity of the dust deposit results in a more uniform current field.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a plan view of a typical ESP section; and

FIG. 2 is a flow schematic of a particulate removal system of the present invention.

DESCRIPTION OF THE PREFERRED EMBODIMENTS

As shown in FIG. 2, a hybrid, wet electrostatic precipitator 10 has a housing 8, a first electric precipitation zone 2 in the path of the flue gas, a second electric precipitation zone 4 and a third electric precipitation zone 6 which are downstream from the first electric precipitation zone 2. Particulate-laden gas enters the housing 8 at entrance 12 and leaves the housing at exit 14. The electric precipitation zones 2, 4, 6 are in series with each other. As would be appreciated by the skilled artisan for the purposes of the present application, the terms collection zone and electric precipitation zone are synonymous and thus used interchangeably here through.

Although FIG. 1 shows horizontal gas flow, the HWESP of the instant invention can be configured such that flow can be directed any direction such as and including vertically or diagonally. The number of electric precipitation zones may also be increased or decreased depending upon the specific design requirements.

The first electric precipitation zone 2 comprises at least one charging electrode, preferably made of alloy steel, and at least one set of collecting electrodes, preferably a plate composed of alloy steel or conductive fiber glass reinforced plastic. The collecting electrodes preferably are planar and substantially parallel to the direction of flow of the gas stream. The first electric precipitation zone 2 inputs a uniform charging field and increased power output to mitigate fine particle space charge and to collect particulates.

The second electric precipitation zone 4 also includes at least one collecting electrode and at least one high-voltage discharge electrode. The collecting electrode in the second electric precipitation zone 4 is composed of membrane material, including, but not limited to, a woven or non-woven fiber, such as carbon or silica fibers, a combination of particulate and binder, a sponge or some other configuration that is porous to permit water to flow throughout. The membrane material is also non-corrosive and can comprise a solid sheet. The collecting electrodes in the second precipitation zone 4 do not have to be made of exemplary conductive materials, because the water is the conductor.

A third electric precipitation zone 6 is located downstream of the first and second electric precipitation zone 4 in the housing 8. The third electric precipitation zone 6 has the same structure and components as the second electric precipitation zone 4. Although FIG. 2 shows a third electric precipitation zone 6, the HWESP 10 of the instant invention may consist of only the first and the second zones 2, 4.

The first electric precipitation zone 2 substantially reduces the particulate amount in the gas stream and reduces space changing effects before the gas stream enters the second and third electric precipitation zones 4, 6, leaving the fine and ultra fine particles and aerosols for removal. Thus, significant fouling of the collecting surfaces in the second and the third electric precipitation zone 4, 6 is avoided.

Spray heads 19 are mounted in the housing 8 for washing and/or wetting the collecting electrodes of the HWESP. A water supply 16 supplies water to the spray heads 19. Spray heads 19 provide water from water supply 16 to spray zone 18a, and membrane wetting zones 18b, 18c, wherein each zone designates one of the electric precipitation zones 2, 4 6. The spray zone 18a for the first electric precipitation zone 2 can be located before and above the collecting electrodes. The membrane wetting zones 18b, 18c of the second and third electric precipitation zones 4, 6 are located above each of the respective fields 4, 6, perpendicular to the gas flow in the housing 8. The spray heads 19 wash the collected particulate off of the collecting electrodes of electric precipitation zones 2. The particulates are washed into hoppers 20 at the bottom of the housing 8. The amount of water supplied to spray zone 18a and membrane wetting zone 18b, and 18c can be adjusted by devices typically used for such purpose, such as valves. The collecting electrodes of the second and third electric precipitation zones 4, 6 will require less water than the collecting electrodes of the first electric precipitation zone. During normal operation, just enough water is provided to saturate the membrane of the collecting electrodes.

In an alternative embodiment, spray heads 19 are positioned only above or upstream of first collection zone 2.

In another alternative embodiment, additional spray heads (not shown) are positioned between one or more abutting collection zones, such that spray is provided upstream of one or more of at least one water saturated porous membrane.

In yet another alternative embodiment a single hopper is used to collect particulate matter washed of one or more collection zones.

In another alternative embodiments two of the at least two electrostatic precipitation zones are provided with different levels of electric current.

The advantages of this invention include:

The design incorporates the best features of both a metallic or conducting fiber glass reinforced WESP and a membrane collecting surface WESP.

The metallic/conducting fiber glass reinforced plastic collecting surface facilitates more aggressive management of space charge than is possible with an all membrane collecting surface WESP. Thus, a smaller overall collecting plate surface area unit would be required when compared to an all membrane WESP.

Utilization of metallic or conductive fiber glass reinforced plastic collecting surfaces for the first zone where the use of more uniform electric field is required to mitigate space charge, results in significantly better overall collection efficiency.

The hybrid design affords the end user a WESP that is both cost effective and corrosion resistant.

The hybrid WESP design will be lighter in weight than an all metal WESP, thus resulting in an overall reduction in casing weight, structural steel weight, foundation loading and construction costs.

The utilization of the membrane enables a WESP design that can be specifically tailored to match the required design conditions. It allows the WESP designer to optimize the collecting plate surface area for the specific design conditions as opposed to providing more surface area than required because of standardization of jigs and fixtures used to fabricate metallic collector plates.

While a specific embodiment of the invention has been shown and described in detail to illustrate the application of the principles of the invention, it will be understood that the invention may be embodied otherwise without departing from such principles.

What is claimed is:

1. A hybrid wet electrostatic precipitator for collecting contaminants from a flue gas stream, the hybrid wet electrostatic precipitator comprising:
    a housing having an opening and an exit for the flue gas stream;
    a first wet electric precipitation zone including at least one discharge electrode, and
    at least one first collecting plate which is substantially parallel to a direction of flow of the flue gas stream,
    a second wet electric precipitation zone being downstream and in series with the first electric precipitation zone, the second electric precipitation zone including at least one discharge electrode and at least one second collecting electrode substantially comprised of a water-saturated porous membrane, and a means for wetting the collecting electrode; and wherein the hybrid wet electrostatic precipitator operates in the absence of a dry electrostatic precipitator.

2. The hybrid wet electrostatic precipitator of claim 1, wherein the means for wetting the second collecting electrode is disposed above the second collecting electrode, and substantially perpendicular to the flow of the flue gas stream in the housing.

3. The hybrid wet electrostatic precipitator of claim 2, further comprising a spray head nozzles disposed before the first collecting plate, substantially parallel to the flow of flue gas stream in the housing.

4. The hybrid wet electrostatic precipitator in accordance with claim 3, wherein the membrane of the second collecting electrode is made of woven silica fiber.

5. The hybrid wet electrostatic precipitator in accordance with claim 3, wherein the membrane of the second collecting electrode is made of woven carbon fiber.

6. The hybrid wet electrostatic precipitator in accordance with claim 3, wherein the membrane of the second collecting electrode comprises polypropylene.

7. The hybrid wet electrostatic precipitator in accordance with claim 1, further comprising a third wet electric precipitation zone being downstream and in series with the first wet electric precipitation zone and the second wet electric precipitation zone, the third wet electric precipitation zone including at least one discharge electrode and at least one third collecting electrode being made of a substantially water-saturated porous membrane.

8. The hybrid wet electrostatic precipitator in accordance with claim 1, wherein the first collecting plate is made of conductive fiber glass reinforced plastic.

9. The hybrid wet electrostatic precipitator in accordance with claim 1, wherein the first collecting plate is made of alloy steel.

10. The hybrid wet electrostatic precipitator in accordance with claim 3, wherein said discharge electrodes are made of alloy steel.

11. The hybrid wet electrostatic precipitator in accordance with claim 3, wherein the first collecting plate of the first wet electric precipitation zone has a surface area smaller than a surface area of the membrane of the second collecting electrode of the second wet electric precipitation zone.

12. The hybrid wet electrostatic precipitator in accordance with claim 3, wherein the first collecting plate of the first wet electric precipitation zone has a surface area substantially equal to a surface area of the membrane of the second collecting electrode of the second wet electric precipitation zone.

13. The hybrid wet electrostatic precipitator in accordance with claim 3, further comprising hoppers for collecting washed particulate at a floor of the housing.

14. The hybrid wet electrostatic precipitator in accordance with claim 7, wherein the first wet electric precipitation zone and the second wet electric precipitation zone are supplied with different levels of electric current.

15. The hybrid wet electrostatic precipitator in accordance with claim 7, wherein the first wet electric precipitation zone, the second wet electric precipitation zone, and the third wet electric precipitation zone are supplied with different levels of electric current.

16. The hybrid wet electrostatic precipitator in accordance with claim 7, further comprising a fourth wet electric precipitation zone being downstream and in series with the first wet electric precipitation zone, the wet second precipitation zone, and the third wet electric precipitation zone, the fourth wet electrostatic precipitator zone including at least one discharge electrode and at least one fourth collecting electrode being made of a substantially water-saturated porous membrane.

* * * * *